United States Patent
Shibata et al.

(10) Patent No.: US 12,275,139 B2
(45) Date of Patent: Apr. 15, 2025

(54) WRIST DEVICE AND ROBOT

(71) Applicant: Kawasaki Jukogyo Kabushiki Kaisha, Kobe (JP)

(72) Inventors: Takeshi Shibata, Kobe (JP); Hitoshi Kudo, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/923,611

(22) PCT Filed: May 7, 2021

(86) PCT No.: PCT/JP2021/017516
§ 371 (c)(1),
(2) Date: Nov. 7, 2022

(87) PCT Pub. No.: WO2021/230153
PCT Pub. Date: Nov. 18, 2021

(65) Prior Publication Data
US 2023/0182326 A1    Jun. 15, 2023

(30) Foreign Application Priority Data
May 12, 2020 (JP) ................................. 2020-083805

(51) Int. Cl.
*B25J 17/02* (2006.01)
*B25J 9/10* (2006.01)

(52) U.S. Cl.
CPC .......... *B25J 17/0283* (2013.01); *B25J 9/102* (2013.01)

(58) Field of Classification Search
CPC .............................. B25J 17/0283; B25J 9/102

USPC ....................................................... 74/490.06
See application file for complete search history.

(56) References Cited

U.S. PATENT DOCUMENTS

| | | | | |
|---|---|---|---|---|
| 4,507,046 A | * | 3/1985 | Sugimoto | ................ B25J 9/046 901/29 |
| 5,497,674 A | * | 3/1996 | Inada | ....................... B25J 9/046 901/29 |
| 5,549,016 A | * | 8/1996 | Nakako | ................ B25J 17/0258 901/29 |

(Continued)

FOREIGN PATENT DOCUMENTS

| | | |
|---|---|---|
| JP | H05-116084 A | 5/1993 |
| JP | H06-312394 A | 11/1994 |
| JP | 3051868 B2 * | 6/2000 .......... B25J 17/0283 |

(Continued)

*Primary Examiner* — T. Scott Fix
(74) *Attorney, Agent, or Firm* — XSENSUS LLP

(57) ABSTRACT

A wrist device includes a first element coupled to an arm to be rotatable about a fifth axis, and a second element coupled to the first element to be rotatable about a sixth axis. There is a fifth motor to rotationally drive the first element, and a sixth motor to rotationally drive the second element. A fifth transmission mechanism transmits a driving force of the fifth motor to the first element and a sixth transmission mechanism transmits a driving force of the sixth motor to the second element. The sixth transmission mechanism includes a first gear rotatably supported by the arm and a second gear rotatably supported by the first element and to mesh with the first gear, and reduces a rotation speed of a driving force in a component group including the first driving gear and components after the first driving gear.

15 Claims, 3 Drawing Sheets

(56) References Cited

U.S. PATENT DOCUMENTS 8,210,069 B2 * 7/2012 Chen ................ B25J 17/0258
                                                                           901/29
2014/0318298 A1 10/2014 Inoue

FOREIGN PATENT DOCUMENTS

| JP | 2014-213437 A | 11/2014 | |
|----|---------------|---------|---|
| JP | 2015-112707 A | 6/2015 | |
| WO | WO-9737817 A1 * | 10/1997 | .......... B25J 17/0258 |

* cited by examiner

WRIST DEVICE AND ROBOT

CROSS-REFERENCE TO RELATED APPLICATIONS

The present application is based on PCT filing PCT/JP2021/017516, filed May 7, 2021, which claims priority to JP 2020-083805, filed May 12, 2020, the entire contents of each are incorporated herein by reference.

FIELD

The technique disclosed here relates to a wrist device and a robot.

BACKGROUND

A wrist device coupled to an arm of a robot has been known to date. Patent Document 1, for example, describes a wrist device divided into a first element and a second element. The first element is rotatably coupled to an arm. The second element is rotatably coupled to the first element. A driving source of the first element and a driving source of the second element are both provided in the arm. Thus, a transmission for transmitting a driving force to the first element is provided in the arm. On the other hand, a transmission for transmitting a driving force to the second element is provided in the arm and the first element.

CITATION LIST

Patent Document

Patent Document 1: Japanese Patent Application Publication No. 2014-213437

SUMMARY

Technical Problem

In the wrist device as described above, since the transmission to the second element is provided in the arm and the first element, when the first element rotates, this rotation affects the transmission to the second element. That is, components of the transmission to the second element disposed in the first element unintentionally rotate together with the first element. Consequently, rotation of the first element can induce rotation of the second element in some cases.

It is therefore an object of the technique disclosed here to reduce rotation of the second element induced by rotation of the first element.

A wrist device disclosed here includes: a first element coupled to an arm to be rotatable about a predetermined first rotation axis; a second element coupled to the first element to be rotatable about a predetermined second rotation axis; a first driver provided in the arm and configured to rotationally drive the first element; a second driver provided in the arm and configured to rotationally drive the second element; a first transmission provided in the arm and configured to transmit a driving force of the first driver to the first element; and a second transmission provided in the arm and the first element and configured to transmit a driving force of the second driver to the second element. The second transmission includes a first driving gear and a first driven gear, the first driving gear being rotatably supported by the arm, the first driven gear being rotatably supported by the first element and configured to mesh with the first driving gear. The second transmission reduces a rotation speed of a driving force in a component group including the first driving gear and one or more components after the first driving gear in a transmission direction of the driving force.

A robot disclosed here includes: an arm including links rotatably coupled to one another; and the wrist device coupled to the arm.

The wrist device can reduce rotation of the second element induced by rotation of the first element.

The robot can reduce rotation of the second element induced by rotation of the first element.

DESCRIPTION OF EMBODIMENTS

An exemplary embodiment will be specifically described hereinafter with reference to the drawings.

Figure 1:
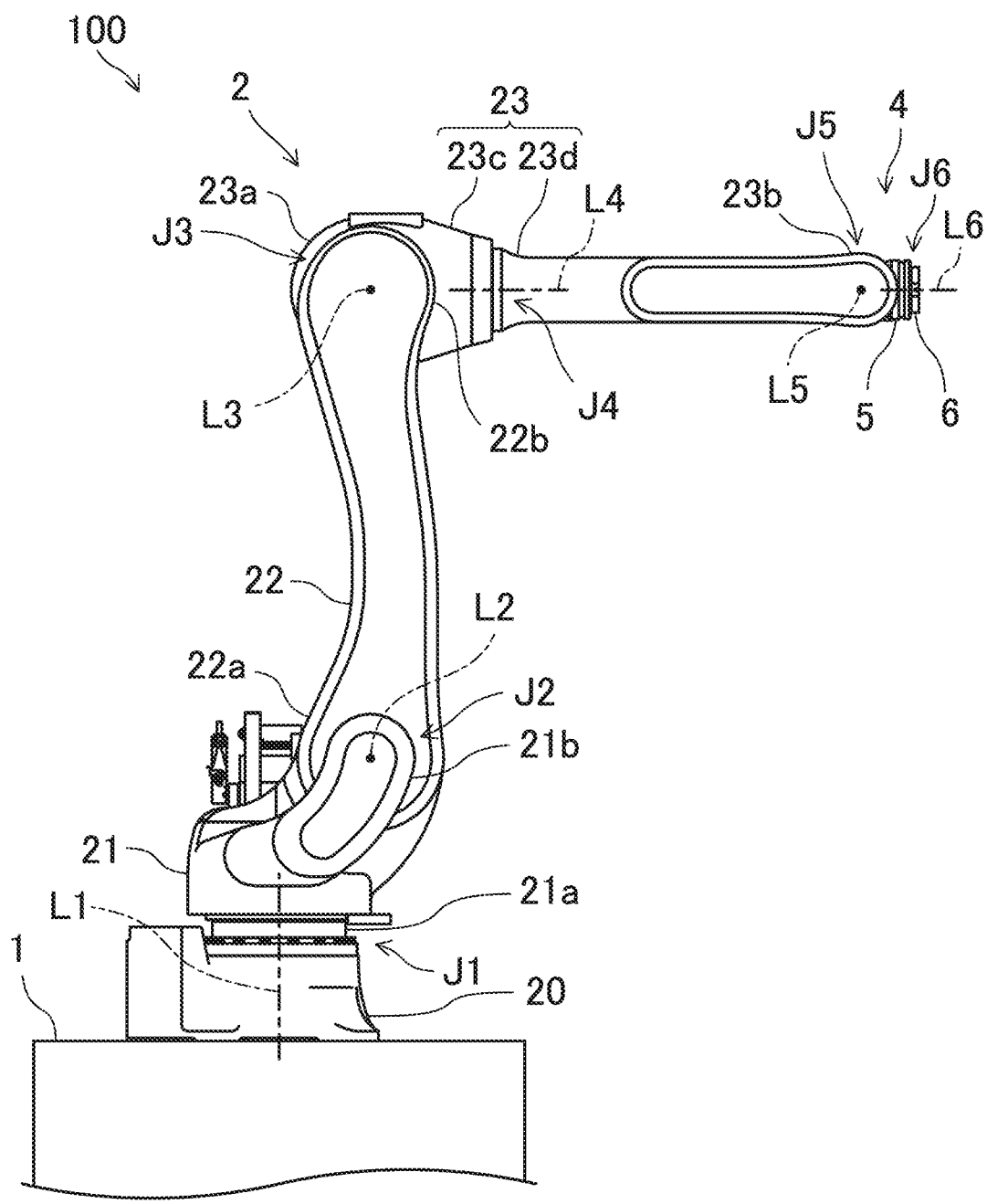
FIG. 1 is a side view of a vertical articulated robot.
Figure 2:
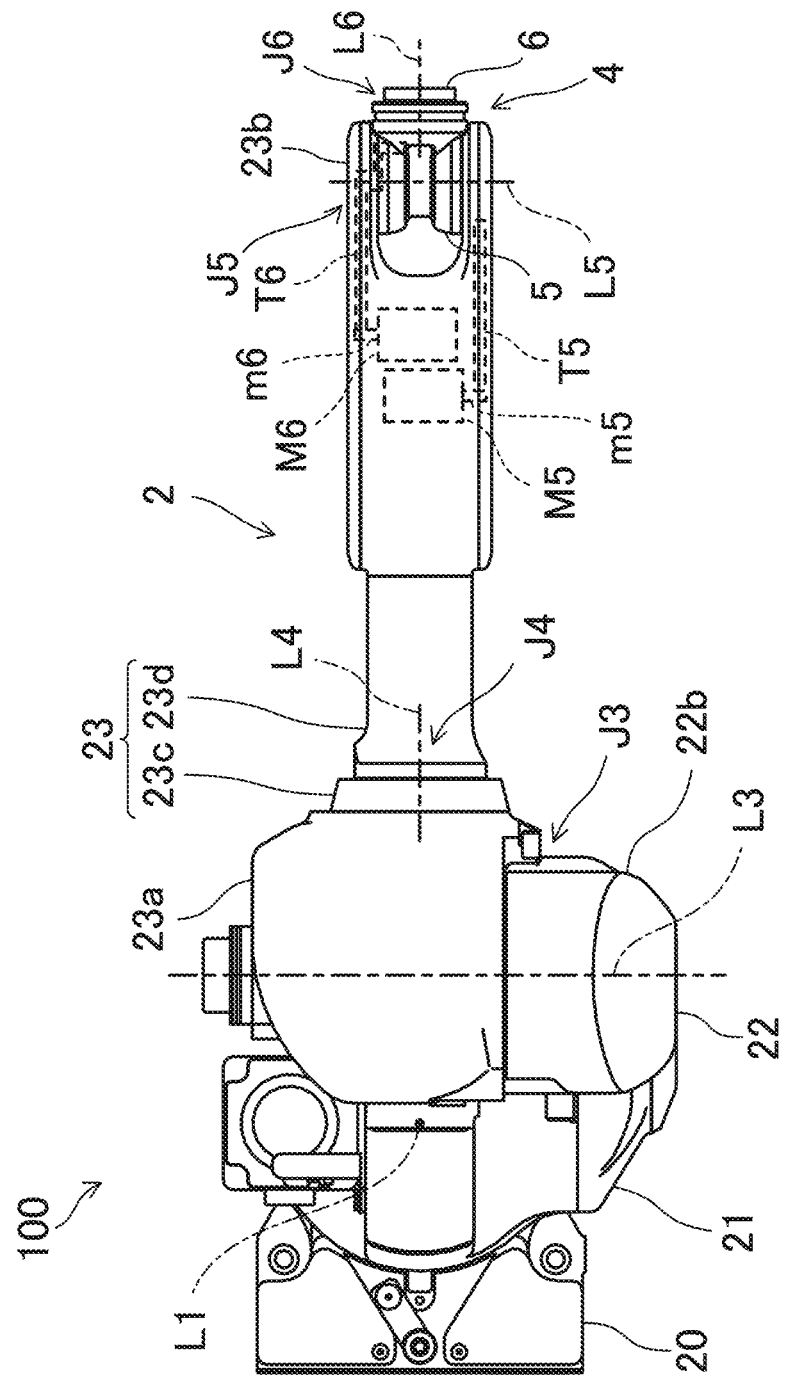
FIG. 2 is a plan view of the vertical articulated robot.

FIG. 1 is a side view of a vertical articulated robot 100. FIG. 2 is a plan view of the vertical articulated robot 100. The vertical articulated robot (hereinafter also referred to simply as "robot") 100 includes a base 1, an arm 2 coupled to the base 1 to be rotatable horizontally, a wrist device 4 provided at the distal end of the arm 2. The base 2 is not shown in FIG. 2. The vertical articulated robot 100 is an example of a robot.

The arm 2 includes links coupled to one another to be rotatable about a horizontal axis. Specifically, the arm 2 includes a first link 21, a second link 22, and a third link 23. The arm 2 also includes a pedestal 20. The pedestal 20 is attached to the base 1. In each link, one longitudinal end will be referred to as a first end, and the other longitudinal end will be referred to as a second end.

A first end 21a of the first link 21 is coupled to the pedestal 20 through a first joint J1 to be rotatable about a vertical first axis L1. A first end 22a of the second link 22 is coupled to a second end 21b of the first link 21 through a second joint J2 to be rotatable about a horizontal second axis L2. A first end 23a of the third link 23 is coupled to a second end 22b of the second link 22 through a third joint J3 to be rotatable about a horizontal third axis L3. The third link 23 is divided into a rear portion 23c including the first end 23a and a front portion 23d including a second end 23b. The front portion 23d is coupled to the rear portion 23c through a fourth joint J4 to be rotatable about a fourth axis L4 extending in the longitudinal direction of the third link 23.

The arm 2 is driven by motors. Although not shown, the motors include a first motor for rotationally driving the first link 21, a second motor for rotationally driving the second link 22, a third motor for rotationally driving the rear portion 23c of the third link 23, and a fourth motor for rotationally driving the front portion 23d of the third link 23. The arm 2 also includes a transmission mechanism for transmitting driving forces of the motors.

The wrist device 4 includes a first element 5 coupled to the arm 2 to be rotatable about a fifth axis L5 and a second element 6 coupled to the first element 5 to be rotatable about a sixth axis L6. The second element 6 is provided with an end effector such as a hand or a gun. The fifth axis L5 is an example of a first rotation axis, and the sixth axis L6 is an example of a second rotation axis.

Specifically, the first element 5 is coupled to the second end 23b of the third link 23 through a fifth joint J5 to be rotatable about the fifth axis L5 orthogonal the fourth axis L4.

The second element 6 is coupled to the first element 5 through a sixth joint J6 to be rotatable about the sixth axis L6 orthogonal to the fifth axis L5. The sixth axis L6 and the fourth axis L4 are aligned in a straight line.

The wrist device 4 also includes a fifth motor M5 disposed in the arm 2 and configured to rotationally drive the first element 5, a sixth motor M6 disposed in the arm 2 and configured to rotationally drive the second element 6, a fifth transmission mechanism T5 disposed in the arm 2 and configured to transmits a driving force of the fifth motor M5 to the first element 5, and a sixth transmission mechanism T6 disposed in the arm 2 and the first element 5 and configured to transmit a driving force of the sixth motor M6 to the second element 6. The fifth motor M5 and the sixth motor M6 are, for example, servo motors.

The fifth motor M5 is an example of a first driver, and the sixth motor M6 is an example of a second driver. The fifth transmission mechanism T5 is an example of a first transmission, and the sixth transmission mechanism T6 is an example of a second transmission.

The front portion 23d of the third link 23 has a hollow shape and has internal space. The first element 5 has a hollow shape and has internal space. The fifth motor M5, the sixth motor M6, and the fifth transmission mechanism T5 are housed in the internal space of the front portion 23d of the third link 23. The sixth transmission mechanism T6 is housed in the internal space of the front portion 23d of the third link 23 and in the internal space of the first element 5. An output axis m5 of the fifth motor M5 and an output axis m6 of the sixth motor M6 are orthogonal to the longitudinal direction of the arm 2 (specifically, the longitudinal direction of the third link 23). In addition, the output axis m5 of the fifth motor M5 and the output axis m6 of the sixth motor M6 extend in parallel with the fifth axis L5.

Figure 3:
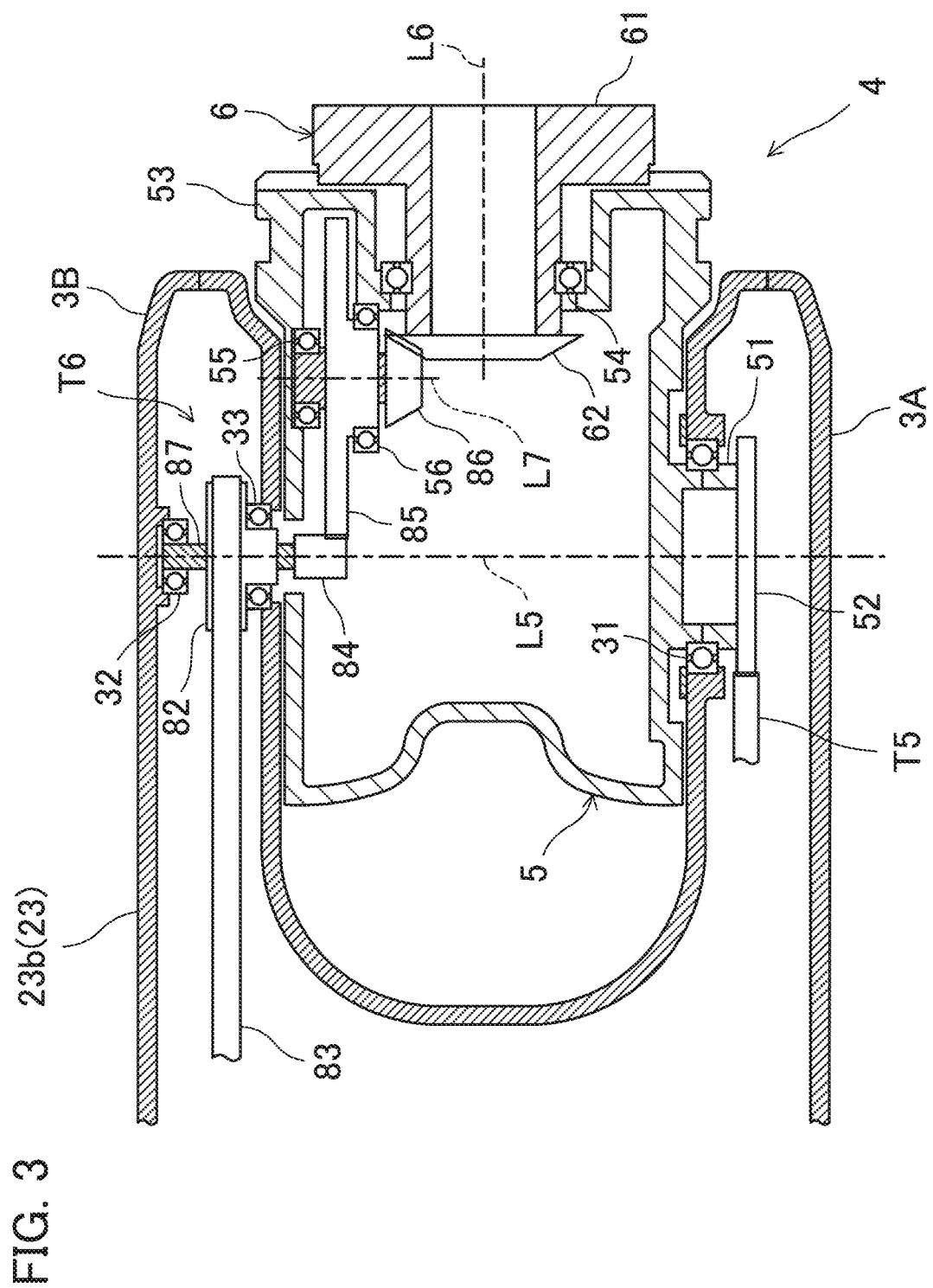
FIG. 3 is a cross-sectional view of a second end of a third link and a wrist device in a plane including a fifth axis and a sixth axis.

Next, a configuration of the wrist device 4 will be described in detail. FIG. 3 is a cross-sectional view of the second end 23b of the third link 23 and the wrist device 4 in a plane including the fifth axis L5 and the sixth axis L6.

The second end 23b of the third link 23 has a two-pronged shape. Specifically, the second end 23b has a first support portion 3A and a second support portion 3B. The first support portion 3A and the second support portion 3B are aligned along the fifth axis L5 with a gap therebetween. The first support portion 3A and the second support portion 3B support the first element 5 such that the first element 5 is rotatable about the fifth axis L5.

The first element 5 includes a first shaft 51 penetrating the first support portion 3A and extending into the first support portion 3A. The first shaft 51 is provided with a gear 52. The gear 52 is a spur gear. The axes of the first shaft 51 and the gear 52 coincide with the fifth axis L5. The first shaft 51 is supported by a first bearing 31 provided in the first support portion 3A to be rotatable about the fifth axis L5. The gear 52 is disposed inside the first support portion 3A.

In this manner, the first element 5 is supported by the first support portion 3A to be rotatable about the fifth axis L5.

The fifth transmission mechanism T5 is disposed in the first support portion 3A. The fifth transmission mechanism T5 is, for example, a gear train. The gear 52 is a gear in the gear train of the fifth transmission mechanism T5. A driving force of the fifth motor M5 is transmitted to the gear 52 through the fifth transmission mechanism T5. Accordingly, the first element 5 rotates about the fifth axis L5 with respect to the first support portion 3A.

The first element 5 has a coupling portion 53 to which the second element 6 is attached. The coupling portion 53 has a substantially cylindrical shape whose axis is the sixth axis L6.

The second element 6 has a substantially cylindrical shape whose axis is the sixth axis L6. The second element 6 penetrates the first element 5 in the coupling portion 53 and extends into the first element 5. An end portion of the second element 6 exposed to the outside of the first element 5 is provided with a flange 61. The second element 6 is supported by the first bearing 54 provided in the first element 5 to be rotatable about the sixth axis L6.

The sixth transmission mechanism T6 is provided in the third link 23 and the first element 5. The sixth transmission mechanism T6 includes a first gear 84 rotatably supported by the arm 2 and a second gear 85 rotatably supported by the first element 5 and configured to mesh with the first gear 84. The sixth transmission mechanism T6 reduces the rotation speed of a driving force multiple times in a component group including the first gear 84 and components after the first gear 84 in the transmission direction of the driving force. The first gear 84 is an example of a first driving gear, and the second gear 85 is an example of a first driven gear.

The sixth transmission mechanism T6 also includes a third gear 86 rotatably supported by the first element 5 and configured to be rotated by rotation of the second gear 85, and a gear 62 provided in the second element 6 and configured to mesh with the third gear 86. The set of the first gear 84 and the second gear 85 and the set of the third gear 86 and the gear 62 reduce the rotation speed of a driving force.

The sixth transmission mechanism T6 also includes a first pully (not shown), a second pully 82, and a timing belt 83.

The first pully is provided on the output axis m6 of the sixth motor M6. The timing belt 83 is wound around the first pully and the second pully 82. The first pully, the second pully 82, and the timing belt 83 are disposed in the third link 23. The second pully 82 is disposed in the second support portion 3B.

The first gear 84 is coaxially coupled to the second pully 82 through a shaft 87. The first gear 84 is a spur gear. The axes of the second pully 82, the first gear 84, and the shaft 87 coincide with the fifth axis L5. The second pully 82 and the first gear 84 are supported to be rotatable about the fifth axis L5 through a second bearing 32 and a third bearing 33 provided in the second support portion 3B. The first gear 84 is disposed in the first element 5.

The second gear 85 meshes with the first gear 84. The second gear 85 is a spur gear. The second gear 85 and the third gear 86 are coaxially and non-rotatably coupled to each other. The third gear 86 is a pinion gear. The second gear 85 and the third gear 86 are supported to be rotatable about an axis L7 parallel to the fifth axis L5 through a second bearing 55 and a third bearing 56 provided in the first element 5. That is, the first gear 84 and the second gear 85 have parallel rotation axes.

The gear 62 has an axis coinciding with the sixth axis L6, and is non-rotatably provided on the second element 6. Specifically, the gear 62 is provided on an end portion of the second element 6 located inside the first element 5. The gear 62 is a ring gear.

The third gear 86 meshes with the gear 62 of the second element 6. The third gear 86 and the gear 62 are hypoid gears. That is, the third gear 86 and the gear 62 have skew rotation axes.

In the thus-configured sixth transmission mechanism T6, a driving force of the sixth motor M6 is sequentially transmitted in the order of the first pully, the timing belt 83, the second pully 82, the first gear 84, the second gear 85, the third gear 86, and the gear 62. Accordingly, the second element 6 rotates about the sixth axis L6 with respect to the first element 5. At this time, the rotation speed of a driving force of the sixth motor M6 is reduced while the driving force is transmitted from the first pully 81 to the second pully 82 through the timing belt 83, is reduced while the driving force is transmitted from the first gear 84 to the second gear 85, and is reduced while the driving force is transmitted from the third gear 86 to the gear 62. A deceleration ratio of the first gear 84 and the second gear 85 is higher than a deceleration ratio of the third gear 86 and the gear 62. A deceleration ratio of the third gear 86 and the gear 62 is higher than a deceleration ratio of the first pully 81 and the second pully 82.

The first gear 84 that transmits a driving force from the third link 23 to the first element 5 in the sixth transmission mechanism T6 has an axis coinciding with the fifth axis L5 that is a rotation axis of the first element 5. Thus, while the first element 5 rotates about the fifth axis L5, an interaxial distance between the first gear 84 and the second gear 85 supported by the first element 5 is maintained constant. That is, even in a case where the first gear 84 supported by the third link 23 is disposed in the first element 5, the first element 5 can rotate about the fifth axis L5 while maintaining meshing between the first gear 84 and the second gear 85.

When the first element 5 rotates, the second gear 85 rotates about the fifth axis L5.

If the first gear 84 does not rotate, the second gear 85 rotates about the first gear 84 while meshing with the first gear 84, and thus, the second gear 85 rotates about the axis L7. When the second gear 85 rotates about the axis L7, the second element 6 rotates about the sixth axis L6 accordingly. Rotation of the second element 6 induced by rotation of the first element 5 will be hereinafter referred to as "induced rotation."

In the thus-configured arm 2, the rotation speed of a driving force of the sixth motor M6 is reduced twice at a subsequent stage, in the transmission direction of the driving force, after the first gear 84 having an axis coinciding with the fifth axis L5 that is a rotation axis of the first element 5. Specifically, the rotation speed of a driving force is reduced once more when the driving force is transmitted from the first gear 84 to the second gear 85, and is further reduced once when the driving force is transmitted from the third gear 86 to the gear 62. Accordingly, relative rotation of the first gear 84 and the second gear 85 occurring when the first element 5 rotates is transmitted to the second element 6 in a significantly reduced state. As a result, induced rotation of the second element 6 can be reduced.

Note that, the sixth motor M6 rotates the first gear 84 to cancel induced rotation of the second element 6 while the first element 5 rotates. That is, the sixth motor M6 rotates the first gear 84 according to rotation of the second gear 85 about the fifth axis L5 such that the second gear 85 does not rotate about the axis L7. Accordingly, induced rotation of the second element 6 is reduced or canceled. Since the deceleration rate from the first gear 84 to the gear 62 is increased as described above, positioning accuracy of the second element 6 in cancelling induced rotation of the second element 6 can be thereby increased. That is, an error can occur because of rattling of gears in the sixth transmission mechanism T6. This error can also occur in rotating the first gear 84 to cancel induced rotation of the second element 6. However, since the deceleration rate of the first gear 84 and the gear 62 is high, an error transmitted to the second element 6 is reduced. As a result, positioning accuracy of the second element 6 is enhanced.

As described above, the wrist device 4 includes: the first element 5 coupled to the arm 2 to be rotatable about the predetermined fifth axis L5 (first rotation axis); the second element 6 coupled to the first element 5 to be rotatable about the predetermined sixth axis L6 (second rotation axis); the fifth motor M5 (first driver) provided in the arm 2 and configured to rotationally drive the first element 5; the sixth motor M6 (second driver) provided in the arm 2 and configured to rotationally drive the second element 6; the fifth transmission mechanism T5 (first transmission) provided in the arm 2 and configured to transmit a driving force of the fifth motor M5 to the first element 5; and the sixth transmission mechanism T6 (second transmission) provided in the arm 2 and the first element 5 and configured to transmit a driving force of the sixth motor M6 to the second element 6. The sixth transmission mechanism T6 includes the first gear 84 (first driving gear) rotatably supported by the arm 2, and the second gear 85 (first driven gear) rotatably supported by the first element 5 and configured to mesh with the first gear 84, and reduces the rotation speed of a driving force in the component group including the first gear 84 and the components after the first gear 84 in the transmission direction of the driving force.

The robot 100 includes the arm 2 including links rotatably coupled to each other, such as the first link 21, the second link 22, and the third link 23, and the wrist device 4 coupled to the arm 2.

In this configuration, since the sixth motor M6 for rotationally driving the second element 6 is provided in the arm 2 and the sixth transmission mechanism T6 for transmitting a driving force of the sixth motor M6 to the second element 6 is provided in the arm 2 and the first element 5, when the first element 5 rotates, components of the sixth transmission mechanism T6 disposed in the first element 5 rotate together with the first element 5. Specifically, in the sixth transmission mechanism T6, since the first gear 84 is rotatably supported by the arm 2 and the second gear 85 is rotatably supported by the first element 5, a component group including the second gear 85 and components after the second gear 85 in the sixth transmission mechanism T6 can rotate together with the first element 5. Here, the sixth transmission mechanism T6 reduces the rotation speed of a driving force in the component group including the first gear 84 and the components after the first gear 84 (i.e., can include meshing between the first gear 84 and the second gear 85). Thus, even when the component group including the second gear 85 and the components after the second gear 85 in the sixth transmission mechanism T6 rotates with rotation of the first element 5, influence of this rotation on the second element 6 is reduced in accordance with the deceleration rate in the component group including the first gear 84 and the components after the first gear 84. As a result, induced rotation of the second element 6 can be reduced.

The first gear 84 and the second gear 85 reduce the rotation speed of a driving force.

With this configuration, even when the second gear 85 rotates about the first gear 84 with rotation of the first element 5, resulting rotation of the second gear 85 about the rotation axis, that is, the axis L7, is reduced. Rotation of the second gear 85 about the axis L7 caused by rotation of the first element 5 is a cause of induced rotation of the second element. Since this rotation of the second gear 85 about the axis L7 is reduced, induced rotation of the second element 6 can be effectively reduced.

The sixth transmission mechanism T6 can reduce the rotation speed of a driving force multiple times in the component group including the first gear 84 and the components after the first gear 84 in the transmission direction of the driving force.

With this configuration, the sixth transmission mechanism T6 has a high deceleration rate in the component group including the first gear 84 and the components after the first gear 84. Thus, even when the component group including the second gear 85 and the components after the second gear 85 in the sixth transmission mechanism T6 rotates with rotation of the first element 5, influence of this rotation on the second element 6 is significantly reduced in accordance with a deceleration rate in the component group including the first gear 84 and the components after the first gear 84. As a result, induced rotation of the second element 6 can be further reduced.

The sixth transmission mechanism T6 also includes the third gear 86 rotatably supported by the first element 5 and configured to be rotated by rotation of the second gear 85, and the gear 62 provided in the second element 6 and configured to mesh with the third gear 86. The set of the first gear 84 and the second gear 85 and the set of the third gear 86 and the gear 62 reduce a rotation speed of a driving force.

With this configuration, the rotation speed of a driving force is reduced at least twice in the set of the first gear 84 and the second gear 85 and the set of the third gear 86 and the gear 62.

In addition, the first gear 84 is supported by the arm 2 to be rotatable about the fifth axis L5.

With this configuration, while the first element 5 rotates about the fifth axis L5, the interaxial distance between the first gear 84 and the second gear 85 is maintained constant. Thus, the first element 5 can rotate about the fifth axis L5 with the first gear 84 and the second gear 85 appropriately meshing with each other.

The gear 62 has an axis coinciding with the sixth axis L6, and is non-rotatably provided in the second element 6.

With this configuration, a driving force of the sixth motor M6 is subjected to reduction of the rotation speed in a last stage of transmission and transmitted to the second element 6. Thus, an error that has occurred while a driving force is transmitted in the sixth transmission mechanism T6 is reduced in a last stage of transmission and transmitted to the second element 6. As a result, positioning accuracy of the second element 6 can be increased.

The second gear 85 and the third gear 86 are coaxial and non-rotatably coupled to each other.

With this configuration, no gears except for the second gear 85 and the third gear 86 are present between the first gear 84 and the gear 62. Thus, in the component group including the first gear 84 and the components after the first gear 84, a configuration for reducing a rotation speed of a driving force can be implemented by a minimum number of gears. As a result, the configuration can be simplified, and an error occurring in transmission of a driving force can be reduced.

Specifically, the first gear 84 and the second gear 85 have parallel rotation axes, and the third gear 86 and the gear 62 have skew rotation axes.

With this configuration, in transmitting a driving force of the sixth motor M6 to the second element 6, the driving force can be transmitted while flexibly changing the rotation axis of the driving force.

More specifically, the first gear 84 and the second gear 85 are spur gears, and the third gear 86 and the gear 62 are hypoid gears.

The deceleration rate of the first gear 84 and the second gear 85 is higher than the deceleration rate of the third gear 86 and the gear 62.

With this configuration, since the configuration of a spur gear is simpler than that of a hypoid gear, a gear pair with a higher deceleration rate can be easily implemented.

The sixth motor M6 has the output axis m6 orthogonal to the longitudinal direction of the arm 2.

With this configuration, the output axis m6 of the sixth motor M6 can be set in parallel with the fifth axis L5 that is the rotation axis of the first element 5. The fifth axis L5 is also the rotation axis of the first gear 84. That is, the output axis m6 of the sixth motor M6 and the rotation axis of the first gear 84 can be oriented in parallel. As a result, a driving force of the sixth motor M6 can be transmitted to the first gear 84 with a simple configuration through gears or pulleys without a change of the direction of the rotation axis.

Other Embodiments

In the foregoing section, the embodiment has been described as an example of the technique disclosed in the present application. The technique disclosed here, however, is not limited to this embodiment, and is applicable to other embodiments obtained by changes, replacements, additions, and/or omissions as necessary. Components described in the embodiment described above may be combined as a new exemplary embodiment. Components provided in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

For example, the fifth transmission mechanism T5 and the sixth transmission mechanism T6 are not limited to the configurations described above. Any configuration may be employed as long as the fifth transmission mechanism T5 is provided in the arm and transmits a driving force of the first driver to the first element. Any configuration may be employed as long as the sixth transmission mechanism T6 is provided in the arm and the first element and transmits a driving force of the second driver to the second element. For example, the fifth transmission mechanism T5 is not limited to the gear train, and may be configured to belt-transmit a driving force with a pully and a timing belt, or may be a combination of a pully, a timing belt, and gears. The sixth transmission mechanism T6 is not limited to the combination of a pully, a timing belt, and gears, and may include only a gear train.

Although the first gear 84 and the second gear 85 mesh with each other in the first element 5, the present technique is not limited to this example. The first gear 84 and the second gear 85 may mesh with each other in the arm 2 (e.g., in the third link 23). In this case, the arm 2 has an opening of a size enough to prevent interference with the second gear 85 such that the second gear 85 can rotate about the fifth axis L5 by rotation of the first element 5. Alternatively, the first gear 84 and the second gear 85 may mesh with each other in a gap between the arm 2 and the first element 5 (i.e., outside the arm 2 and outside the first element 5).

The first gear 84 and the second gear 85 are not limited to spur gears. The first gear 84 and the second gear 85 may be bevel gears or hypoid gears, for example.

The third gear 86 and the gear 62 are not limited to hypoid gears. The third gear 86 and the gear 62 may be bevel gears. That is, the third gear 86 and the gear 62 may have intersecting rotation axes. Alternatively, the third gear 86 and the gear 62 may be spur gears.

Gears except for the second gear 85 and the third gear 86 may be provided between the first gear 84 and the gear 62.

In the component group including the first gear 84 and the components after the first gear 84 in the transmission direction of a driving force in the sixth motor M6, the rotation speed of the driving force may not be reduced multiple times, and may be reduced once. For example, in a case where the rotation speed of a driving force is reduced by the first gear 84 and the second gear 85, the third gear 86 and the gear 62 may transmit the driving force at a constant speed or an increased speed. Alternatively, in a case where the rotation speed of a driving force is reduced by the third gear 86 and the gear 62, the first gear 84 and the second gear 85 may transmit the driving force at a constant speed or an increased speed.

The output axis m5 of the fifth motor M5 and the output axis m6 of the sixth motor M6 may not parallel to the fifth axis L5. For example, the output axis m5 of the fifth motor M5 and the output axis m6 of the sixth motor M6 may be parallel to the longitudinal direction of the third link 23.

The arm 2 is not limited to the configuration described above. For example, the number of links of the arm 2 is not limited to three. The number of links may be one, or may be two or four or more.

The robot 100 is not limited to a vertical articulated robot. For example, the robot 100 may be a horizontal articulated robot.

DESCRIPTION OF REFERENCE CHARACTERS

100 vertical articulated robot (robot)
2 arm
21 first link (link)
22 second link (link)
23 third link (link)
4 wrist device
5 first element
6 second element
62 gear (second driven gear)
84 first gear (first driving gear)
85 second gear (first driven gear)
86 third gear (second driving gear)
L5 fifth axis (first rotation axis)
L6 sixth axis (second rotation axis)
M5 fifth motor (first driver)
M6 sixth motor (second driver)
T5 fifth transmission mechanism (first transmission)
T6 sixth transmission mechanism (second transmission)

The invention claimed is:

1. A wrist device, comprising:
   a first element coupled to an arm configured to be rotatable about a first rotation axis;
   a second element coupled to the first element configured to be rotatable about a second rotation axis which is perpendicular to the first rotation axis;
   a first driver in the arm and configured to rotationally drive the first element;
   a second driver in the arm and configured to rotationally drive the second element;
   a first transmission in the arm and configured to transmit a driving force of the first driver to the first element; and
   a second transmission in the arm and in the first element, the second transmission configured to transmit a driving force of the second driver to the second element,
   wherein:
   the second transmission includes a first driving gear which rotates about the first rotation axis and a first driven gear, the first driving gear being rotatably supported by the arm, the first driven gear being rotatably supported by the first element and configured to mesh with the first driving gear,
   the second transmission reduces a rotation speed of a corresponding driving force in a component group including the first driving gear and one or more components downstream of the first driving gear,
   the first driving gear is smaller than the first driven gear,
   a first rotational motion of the first driving gear about the first rotation axis causes a second rotational motion of the first driven gear, a magnitude of the second rotational motion being less than a magnitude of the first rotational motion,
   the second transmission includes a second driving gear and a second driven gear, the second driving gear being rotatably supported by the first element and configured to be rotated by rotation of the first driven gear, the second driven gear being in the second element and configured to mesh with the second driving gear, and
   a set of the first driving gear and the first driven gear and a set of the second driving gear and the second driven gear reduce the rotation speed of the corresponding driving force, and
   the first driven gear and the second driving gear are coaxially and non-rotatably coupled to each other.

2. The wrist device according to claim 1, wherein the second transmission reduces the rotation speed of the corresponding driving force multiple times in the component group.

3. The wrist device according to claim 1, wherein the first driving gear is supported by the arm.

4. The wrist device according to claim 1, wherein the second driven gear has an axis coinciding with the second rotation axis, and is fixed relative to the second element.

5. The wrist device according to claim 1, wherein:
   the first driving gear and the first driven gear have parallel rotation axes, and
   the second driving gear and the second driven gear have intersecting or skew rotation axes.

6. The wrist device according to claim 5, wherein:
   the first driving gear and the first driven gear are spur gears, and
   each of the second driving gear and the second driven gear is a bevel gear or a hypoid gear.

7. The wrist device according to claim 5, wherein a deceleration rate of the first driving gear and the first driven gear is higher than a deceleration rate of the second driving gear and the second driven gear.

8. The wrist device according to claim 1, wherein the second driver has an output axis orthogonal to a longitudinal direction of the arm.

9. A robot comprising:
   an arm including links rotatably coupled to one another; and a wrist device coupled to the arm, the wrist device including:
a first element coupled to the arm configured to be rotatable about a first rotation axis;
a second element coupled to the first element configured to be rotatable about a second rotation axis which is perpendicular to the first rotation axis;
a first driver in the arm and configured to rotationally drive the first element;
a second driver in the arm and configured to rotationally drive the second element;
a first transmission in the arm and configured to transmit a driving force of the first driver to the first element; and
a second transmission in the arm and in the first element, the second transmission configured to transmit a driving force of the second driver to the second element,
wherein:
the second transmission includes a first driving gear which rotates about the first rotation axis and a first driven gear, the first driving gear being rotatably supported by the arm, the first driven gear being rotatably supported by the first element and configured to mesh with the first driving gear,
the second transmission reduces a rotation speed of a corresponding driving force in a component group including the first driving gear and one or more components downstream of the first driving gear, and
the first driving gear is smaller than the first driven gear,
a first rotational motion of the first driving gear about the first rotation axis causes a second rotational motion of the first driven gear, a magnitude of the second rotational motion being less than a magnitude of the first rotational motion, and
when the first driver rotationally drives the first element and the second driver is fixed and does not drive the second element, the first driven gear of the second transmission rotates due to rotation of the first element.

10. The robot according to claim 9, wherein:
the first driver and the second driver are both mounted off of the first element and the second element.

11. The robot according to claim 9, wherein:
the arm includes a hollow portion that encloses at least a part of the first element, the first driving gear, and at least a part of the first driven gear.

12. A wrist device, comprising:
a first element coupled to an arm configured to be rotatable about a first rotation axis;
a second element coupled to the first element configured to be rotatable about a second rotation axis which is perpendicular to the first rotation axis;
a first driver in the arm and configured to rotationally drive the first element;
a second driver in the arm and configured to rotationally drive the second element;
a first transmission in the arm and configured to transmit a driving force of the first driver to the first element; and
a second transmission in the arm and in the first element, the second transmission configured to transmit a driving force of the second driver to the second element,
wherein:
the second transmission includes a first driving gear which rotates about the first rotation axis and a first driven gear, the first driving gear being rotatably supported by the arm, the first driven gear being rotatably supported by the first element and configured to mesh with the first driving gear,
the second transmission reduces a rotation speed of a corresponding driving force in a component group including the first driving gear and one or more components downstream of the first driving gear,
the first driving gear is smaller than the first driven gear,
a first rotational motion of the first driving gear about the first rotation axis causes a second rotational motion of the first driven gear, a magnitude of the second rotational motion being less than a magnitude of the first rotational motion,
wherein when the first driver rotationally drives the first element and the second driver is fixed and does not drive the second element, the first driven gear of the second transmission rotates due to rotation of the first element.

13. The wrist device according to claim 1, wherein:
the first driver and the second driver are both mounted off of the first element and the second element.

14. The wrist device according to claim 1, wherein:
the arm includes a hollow portion that encloses at least a part of the first element, the first driving gear, and at least a part of the first driven gear.

15. The wrist device according to claim 1, wherein the first driven gear and the second driving gear rotate about a third rotation axis which is parallel to the first rotation axis.

* * * * *